(No Model.)

H. B. GIBBON.
VEHICLE AXLE NUT.

No. 300,965. Patented June 24, 1884.

WITNESSES
Chas. D. Davis
J. J. McCarthy.

INVENTOR
H. B. Gibbon
By C. M. Alexander
Attorney

United States Patent Office.

HARMON B. GIBBON, OF TIFFIN, OHIO.

VEHICLE-AXLE NUT.

SPECIFICATION forming part of Letters Patent No. 300,965, dated June 24, 1884.

Application filed August 16, 1883. (No model.)

*To all whom it may concern:*

Be it known that I, HARMON B. GIBBON, a citizen of the United States, residing at Tiffin, in the county of Seneca and State of Ohio, have invented certain new and useful Improvements in Axle-Nuts, of which the following is a specification, reference being had therein to the accompanying drawings.

This invention relates to carriage-axle boxes or bushings for hubs and the like; and the object of the same is to take up the wear incident to revolving on the spindle of the axle or other objects.

My invention consists in the novel construction and combination of parts, as will be hereinafter more fully set forth, and pointed out in the claim.

Figure 1:
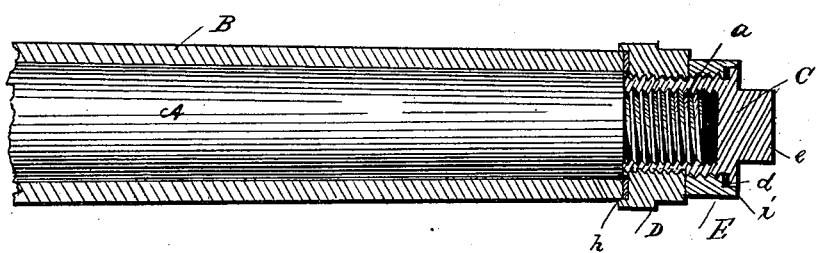
Figure 2:
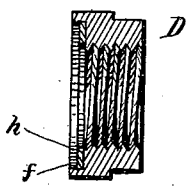

In the annexed drawings, Figure 1 represents the end portion of the spindle of an axle with a portion of a boxing or bushing in section, with my improvements applied thereto; Fig. 2, a sectional view of the nut D, and Fig. 3 an exterior view of the nut C.

In the figures, letter A represents the spindle of an axle, formed at its inner end with the usual shoulders and collar over which is properly fitted and adjusted the boxing or bushing B, provided at its inner end with a raised flange and enlarged portions to fit the shoulders and collar of the spindle. The spindle is provided with the usual groove for the lubricating material, and is also provided at its outer end with screw-threads a on the reduced portion of the spindle.

Figure 3:
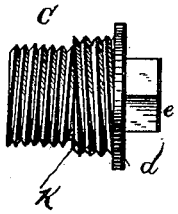

The letter C represents a cap formed with internal and external screw-threads, a flange, d, and a rectangular end or head, e, to receive a wrench to screw the same upon the screw-threaded portion of the spindle. The external screw-threads of this cap should be of the right and left hand class, for the purpose hereinafter stated; or they may be formed with an intermediate shoulder, K, as shown in Fig. 3 of the drawings.

The letter D represents a nut constructed at its inner end with an annular space, f, for the reception of an elastic washer, h. This nut is also formed at its inner end with a cylindrical portion, which constitutes a part of the flange for the annular space f, and is of such a diameter as to fit over the end of the boxing.

The letter E represents a jam-nut formed with an annular space and flange, i, adapted to engage and fit over the flange d of the cap. The nuts D and E are adjusted upon the cap C. The nut D, with the washer at the front end, is adjusted in front of the jam-nut, and the cap with the two nuts is now applied to the end of the spindle after the boxing is in position, and screwed home, after which the nut D is adjusted forward, so that its elastic washer will abut against the end of the boxing and the flange thereof fit over the end of the boxing. The jam-nut E is now adjusted forward and against the nut D, to lock the same in position and from backward displacement. Whenever the boxing becomes worn, the slack is readily taken up by adjusting forward the lock-nut and the jam-nut, which effectually take up the slack and obviate the rattling noise.

By my improvement the multiplicity of washers now generally used in axle-boxes is obviated, and the annoyance attending the same.

What I claim as my invention, and desire to secure by Letters Patent, is—

In a hub-attaching device, the combination, with an axle-spindle having a screw-threaded end, a, of the cap c, formed with a squared head, e, an internal screw-threaded recess adapted to fit over the end a, and with external right and left screw-threaded portions, and the nuts D and E, having annular grooves at their ends and adapted to fit upon the respective right and left screw-threaded portions of the cap C, and the washers h d, all constructed and arranged to operate substantially in the manner specified.

In testimony whereof I affix my signature in presence of two witnesses.

HARMON B. GIBBON.

Witnesses:
J. W. LEAHY,
WALTER S. CRAMER.